United States Patent
Wittke et al.

(10) Patent No.: US 11,199,951 B1
(45) Date of Patent: Dec. 14, 2021

(54) DATABASE SYSTEM DASHBOARD SNAPSHOTTING

(71) Applicant: Salesforce.com, Inc., San Francisco, CA (US)

(72) Inventors: Eric Paul Wittke, San Francisco, CA (US); Laurel Knell, San Francisco, CA (US); Laurel Tripp, San Francisco, CA (US); Tamar Akavia, Tel Aviv (IL); Abigail Kutruff, San Francisco, CA (US); Tal Marom, Tel Aviv (IL); Aner Gelem, Tel Aviv (IL); Yaniv Ben Arie, Tel Aviv (IL)

(73) Assignee: salesforce.com, Inc., San Francisco, CA (US)

( * ) Notice: Subject to any disclaimer, the term of this patent is extended or adjusted under 35 U.S.C. 154(b) by 0 days.

(21) Appl. No.: 16/883,578

(22) Filed: May 26, 2020

(51) Int. Cl.
*G06F 3/0484* (2013.01)
*G06F 3/0481* (2013.01)
*G06F 16/25* (2019.01)

(52) U.S. Cl.
CPC .......... *G06F 3/0484* (2013.01); *G06F 3/0481* (2013.01); *G06F 16/252* (2019.01)

(58) Field of Classification Search
CPC ..... G06F 16/252; G06F 3/0484; G06F 3/0481
See application file for complete search history.

(56) References Cited

U.S. PATENT DOCUMENTS

| | | | |
|---|---|---|---|
| 2012/0089902 A1* | 4/2012 | Sheflin | G06T 1/0007 715/234 |
| 2013/0031499 A1* | 1/2013 | Vishnubhatta | G06Q 10/08 715/765 |
| 2014/0108985 A1* | 4/2014 | Scott | G05B 19/4188 715/771 |
| 2016/0117810 A1* | 4/2016 | Berry | G06F 3/0485 715/738 |
| 2020/0099771 A1 | 3/2020 | Hsu et al. | |

FOREIGN PATENT DOCUMENTS

CN 109491744 A * 3/2019

OTHER PUBLICATIONS

Techsmith, "Snagit Help 2020", Dec. 2019, TechSmith corp., All Pages (Year: 2019).*
Aslushnikov, "Puppeteer API Tip-Of-Tree", Jan. 20, 2019, GitHub. com, all pages (Year: 2019).*

\* cited by examiner

*Primary Examiner* — Roberto Borja
(74) *Attorney, Agent, or Firm* — Kwan & Olynick LLP (57) ABSTRACT

A user interface generation message may be sent from a database system to a client machine via a network. The user interface generation message may include instructions for presenting a database dashboard on a display screen at the client machine. The database dashboard may include a plurality of user interface components that each presents a respective view of information stored in a database. A user interface component selection message may be received from the client machine, identifying one or more of the user interface components. A visual snapshot of the identified user interface components may be created at the database system.

16 Claims, 8 Drawing Sheets

DATABASE SYSTEM DASHBOARD SNAPSHOTTING

FIELD OF TECHNOLOGY

This patent document relates generally to database systems and more specifically to client-server communication for interacting with database systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

One use of a cloud computing system is a network-accessible database system. A database system associated with a cloud computing service provider may store information associated with various organizations accessing computing services via the service provider.

Another use of a cloud computing system is interacting with database objects. A user interface may provide a vehicle for viewing and editing information stored in a database. The user interface may be presented in a webpage accessible via a web browser. Alternatively, or additionally, a native application or other access mechanism may be employed.

BRIEF DESCRIPTION OF THE DRAWINGS

The included drawings are for illustrative purposes and serve only to provide examples of possible structures and operations for the disclosed inventive systems, apparatus, methods and computer program products for database system user interface snapshotting. These drawings in no way limit any changes in form and detail that may be made by one skilled in the art without departing from the spirit and scope of the disclosed implementations.

DETAILED DESCRIPTION

According to various embodiments, techniques and mechanisms described herein provide for a database system snapshotting system. A server may transmit to a client machine a user interface, which may represent information stored in a database system. The client machine may identify one or more user interface components to include in a snapshot, and may then transmit to the server a snapshot configuration message identifying those user interface components. The server may generate and transmit a user interface based on the snapshot configuration message.

Consider the example of Alexandra, a user of an on-demand computing services environment. Alexandra employs the on-demand computing services environment to access and edit information. In many situations, Alexandra would like to share views of information she is accessing with her colleagues or clients. However, Alexandra would like to share not only information stored in a database, but rather Alexandra's user-configurable view of such information, which may be selected and aggregated to reflect Alexandra's goals and perspectives.

According to conventional techniques, Alexandra could capture an image-based screenshot of specific information presented on a display screen on Alexandra's computer. However, such an approach requires significant manual effort on Alexandra's part. Further, such conventional approaches may fail to capture information that is included in the user interface but not necessarily presented on the display screen at the time of image capture. Finally, such an approach may include information Alexandra does not wish to capture, such as parts of the user interface that are not relevant to the sharing operation.

According to techniques and mechanisms described herein, Alexandra can select one or more user interface components to share. The server will then generate a snapshot suitable for sharing. Alexandra may then share the snapshot in one or more of a variety of ways. Such techniques and mechanisms may allow Alexandra to create and access customized views of data stored in a database, and then shared those customized views with colleagues and others in an efficient and seamless manner.

Figure 1:
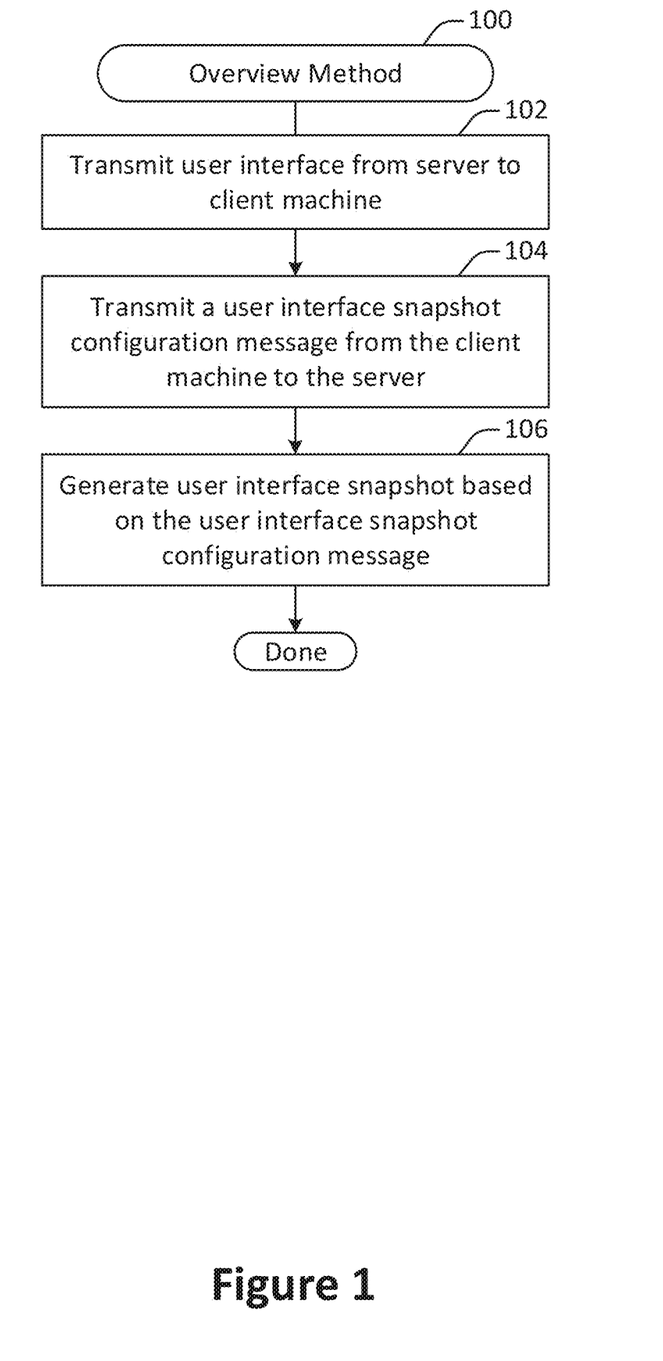
FIG. 1 illustrates an example of an overview method for user interface snapshotting, performed in accordance with one or more embodiments.

FIG. 1 illustrates an example of an overview method 100 for user interface snapshotting, performed in accordance with one or more embodiments. The method 100 may be performed at a client device and a server system in communication. For example, the method 100 may be performed at one or more of the systems and devices shown in FIG. 4, FIG. 5, and FIG. 6.

A user interface is transmitted from the server to the client machine at 102. According to various embodiments, the user interface may be any interface suitable for accessing information transmitted from a server. For example, the user interface may be used to access information stored in a database accessible via the server. The database may be accessible in the context of an on-demand computing services environment configured to provide computing services to a variety of organizations via the internet.

A user interface snapshot configuration message is transmitted from the client machine to the server at 104. In some implementations, the user interface snapshot configuration message may be generated based on user input. For example, a user at the client machine may identify one or more components within the user interface for generating a snapshot. As another example, the user may identify one or more configuration parameters associated with snapshot generation. Additional details related to the generation of a user interface snapshot configuration message are discussed with respect to the method 200 shown in FIG. 2.

A user interface screenshot is generated at 106 based on the user interface snapshot configuration message. In some implementations, the user interface snapshot may be generated by determining a view of one or more user interface components transmitted to the client machine at 102. The view may be generated by selecting the user interface components identified in the user interface snapshot configuration message, subject to any configuration parameters associated with snapshot generation. Additional details related to the generation of a user interface snapshot are discussed with respect to the method 300 shown in FIG. 3.

Figure 7:
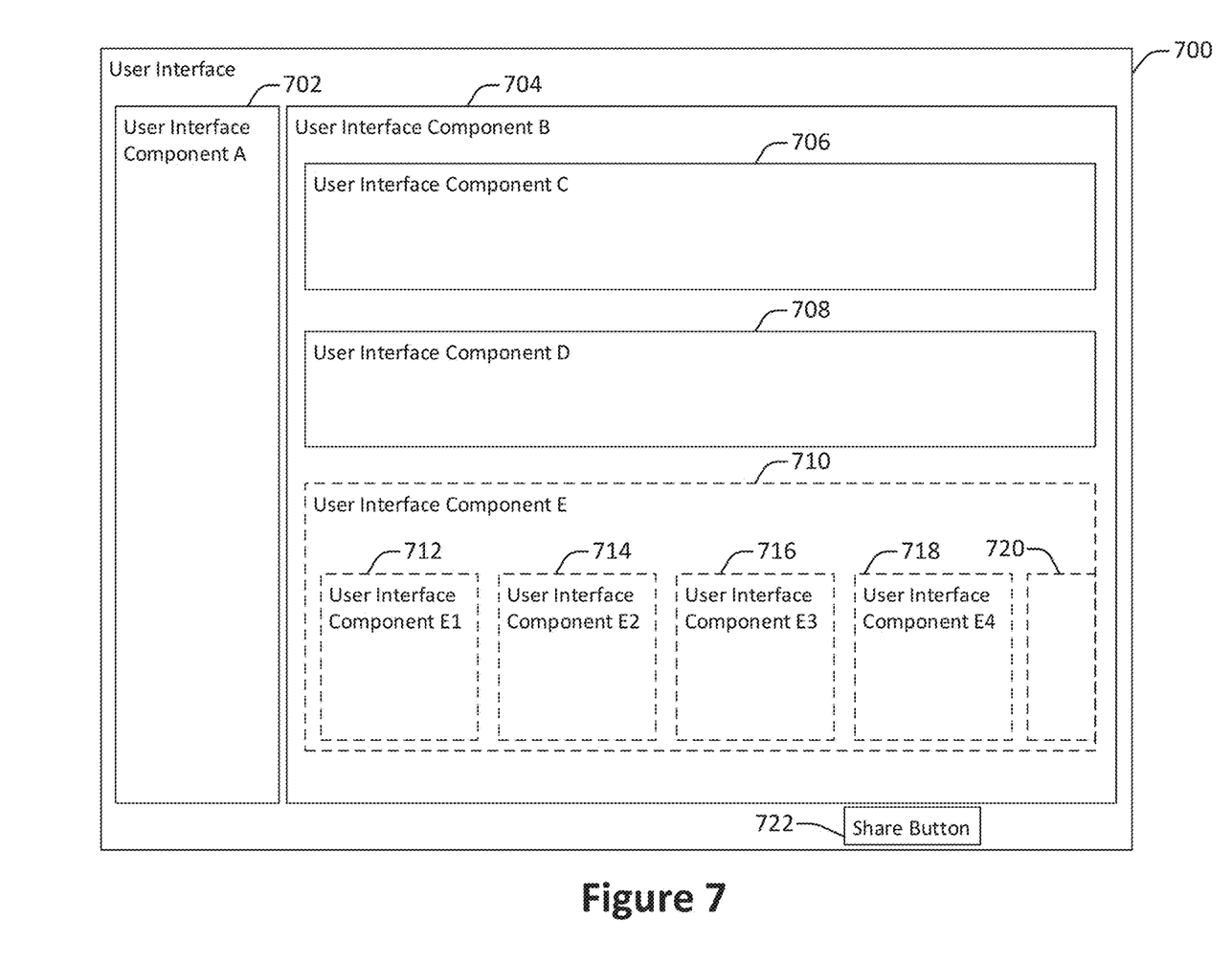
FIG. 7 illustrates one example of a graphical user interface configured in accordance with one or more embodiments.
Figure 8:
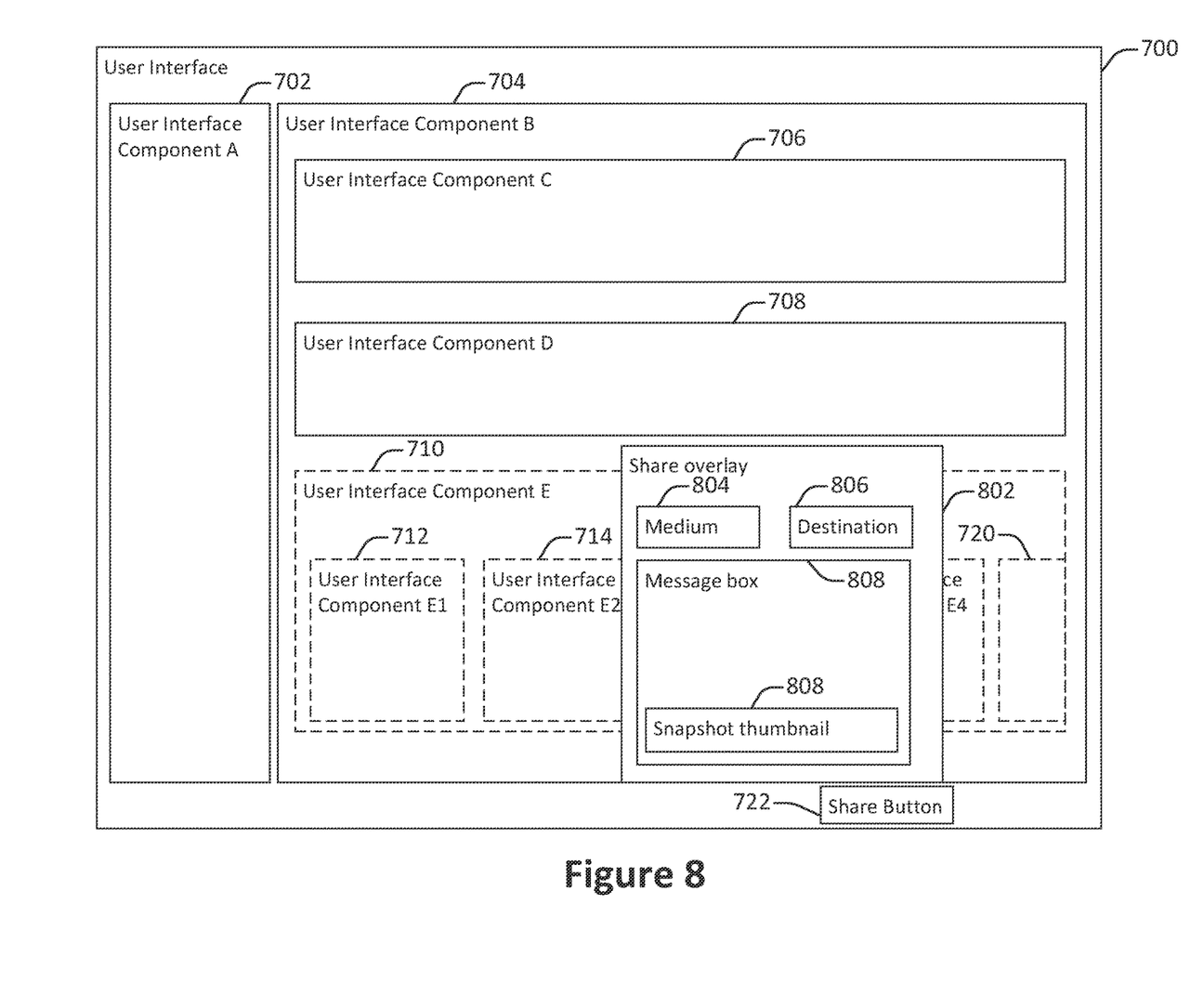
FIG. 8 illustrates another example of a graphical user interface configured in accordance with one or more embodiments.

FIG. 7 and FIG. 8 illustrate examples of a graphical user interface 700 configured in accordance with one or more embodiments. The graphical user interface 700 illustrates the generation of a graphical user interface snapshot in accordance with one or more embodiments of techniques and mechanisms described herein. The user interface 700 provides a view of information stored in a database, such as a marketing spend and return analysis. For instance, the graphical user interface 700 may be a web page presented in a web browser.

The graphical user interface 700 includes a number of user interface components, such as the user interface component A 702, the user interface component B 704, the user interface component C 706, the user interface component D 708, and the user interface component E 710. A user interface component can itself include other user interface components, such as the user interface components E1 712, E2 714, E3 716, E4 718, and E5 720 included in the user interface component E 710. Each user interface component may be implemented as, for example, a <div>, <iframe>, or other such tag in an HTML context.

In particular embodiments, one or more of the user interface components may present information stored in a database. For example, the user interface component E 710 may display marketing information, while the user interface components E1 712, E2 714, E3 716, E4 718, and E5 720 may display marketing information associated with different communication channels.

In some embodiments, user interface components may be selected automatically at the server. Alternatively, or additionally, one or more of the user interface components may be selected based on user input. For instance, a user may identify which of the marketing channels for which to generate the user interface components E1 712, E2 714, E3 716, E4 718, and E5 720.

The user interface 702 also includes a share button 722 by which a user can provide user input indicating a request to generate a user interface snapshot in accordance with techniques and mechanisms described herein. When a user indicates a request to create a user interface snapshot and then selects a user interface component, for instance by clicking on it, a snapshot is created and presented In some implementations, a view of the snapshot may be created, for instance as a thumbnail. For example, the user interface snapshot thumbnail 808 shown in FIG. 8 corresponds with the user interface component 710. The user interface snapshot thumbnail 808 may be a smaller version of the actual snapshot. For instance, the user interface snapshot thumbnail 808 may have a smaller resolution and/or be cropped to present only part of the actual snapshot.

The user interface snapshot overlay 802 may then be used to perform actions related to the snapshot, such as annotating the snapshot with text, identifying one or more recipients of the snapshot, identifying one or more channels through which to send the snapshot, and/or sending the snapshot to the identified recipients.

The user interface snapshot overlay 802 includes a medium window 804. A user may use the medium window 804 to identify a medium through which to send the snapshot, such as email or one or more messaging services.

The user interface snapshot overlay 802 also includes a destination window 806. A user may use the destination window 806 to identify one or more recipients of the snapshot. A recipient may be an individual, a group of individuals, a storage location, a device, or any other addressable destination for transmitting the snapshot.

A message box is shown at 808. A user may use the message box to include a message along with the snapshot. For example, the user may characterize the snapshot, or ask a question about it. As another example, the user may conduct a conversation about the snapshot, for instance via a messaging service.

In some implementations, a snapshot may include one or more user interface components that are not actually present on the screen. For example, in FIG. 7, the user interface component E 710 includes a scrollable view of different user interface components included within the user interface component E 710, such as the user interface components E1 712, E2 714, E3 716, E4 718, and E5 720. By selecting the user interface component E 710, the user interface component 720 may be included in the snapshot even though it is not fully presented on the display screen. In addition, one or more user interface components not shown at all in FIG. 7, such as user interface components included within the user interface component E but not currently displayed on the display screen, may also be included in the snapshot.

Figure 2:
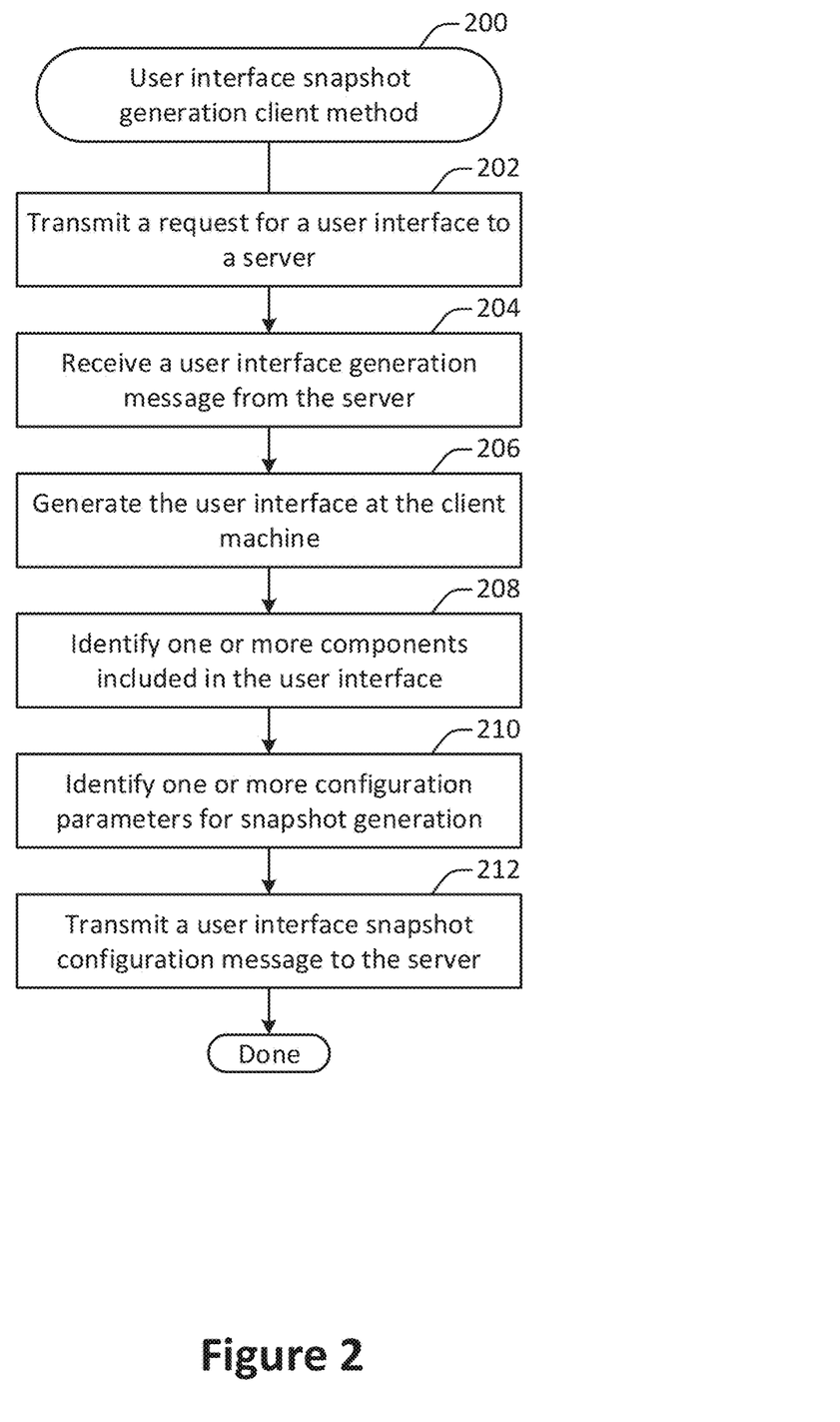
FIG. 2 illustrates an example of a client-side method for user interface snapshot generation, performed in accordance with one or more embodiments.

FIG. 2 illustrates an example of a client-side method 200 for user interface snapshot generation, performed in accordance with one or more embodiments. The method 200 may be performed at a client device and a server system in communication. For example, the method 200 may be performed at one or more of the systems and devices shown in FIG. 4, FIG. 5, and FIG. 6. The method 200 may be performed in conjunction with one or more other methods described herein, such as the method 100 shown in FIG. 1 and/or the method 300 shown in FIG. 3.

A request for a user interface is transmitted to a server at 202. In some implementations, the request for the user interface may be generated as part of the interaction of a user with a remote database. For example, the user may transmit a request to access a user interface for presenting information about one or more objects stored in a database.

In some embodiments, the request for the user interface may be generated as part of the interaction of a user with an on-demand computing services environment. For instance, the user may access a user interface in association with accessing services such as customer relations management operations, customer sales management operations, customer service management operations, marketing operations, or other such services.

A user interface generation message is received from the server at 204. According to various embodiments, the user interface generation message may include any information involved in generating the requested user interface at the client machine. In some configurations, more than one user interface generation message may be received.

In some implementations, the user interface generation message may include information such as data retrieved from a database. Such information may include, for instance, data values associated with data fields included within database objects.

In some implementations, the user interface generation message may include presentation and control information such as HyperText Markup Language (HTML) tags, Cascading Style Sheet (CSS) tags, Javascript computer programming language instructions, and other such information.

The user interface is generated at the client machine at 206. In some implementations, the user interface may be generated via a native application. Alternatively, the user interface may be generated in a web browser.

One or more components included in the user interface are identified at 208. In some implementations, user interface components may be identified by selecting them with a pointing device such as a mouse. Alternatively, or additionally, user interface components presented on a touch screen may be identified by selecting them via the touch interface.

In some configurations, a user interface may include a selection affordance to indicate that the provided user input identifies component selection and not some other form of user input. For example, the selection affordance may be a button in a bar associated with the user interface component. As another example, the selection affordance may be a toggle switch for the user interface as a whole.

One or more configuration parameters for snapshot generation are identified at 210. According to various embodiments, the one or more configuration parameters may include any information for instructing the server as to how to generate the snapshot based on the identified user interface components. For example, a configuration parameter may specify a grid in which to lay out a set of user interface components. As another example, a configuration parameter may specify an image size or resolution associated with the generated snapshot. As yet another example, a configuration parameter may specify one or more formatting options such as color schemes.

In some embodiments, a configuration parameter may specify a filter applied to a dashboard to apply context to a user interface component. For example, a configuration parameter may specify one or more characteristics for generating a user interface component, such as a date range, a user segment, or an organization.

In some implementations, a configuration parameter may be specified by a user, for instance via a selection interface or a configuration file. Alternatively, or additionally, a configuration parameter may be determined at the server. For instance, a user, organization, or user interface component may be associated with one or more default configuration parameters, which may or may not be editable by a user.

A user interface snapshot configuration message is transmitted to the server at 212. According to various embodiments, the user interface snapshot configuration message may include any information suitable for generating a snapshot of the identified user interface components at the server. Such information may include, but is not limited to: a user identifier, a user interface identifier, one or more user interface component identifiers, one or more database record identifiers, and/or one or more user interface snapshot configuration parameters.

Figure 3:
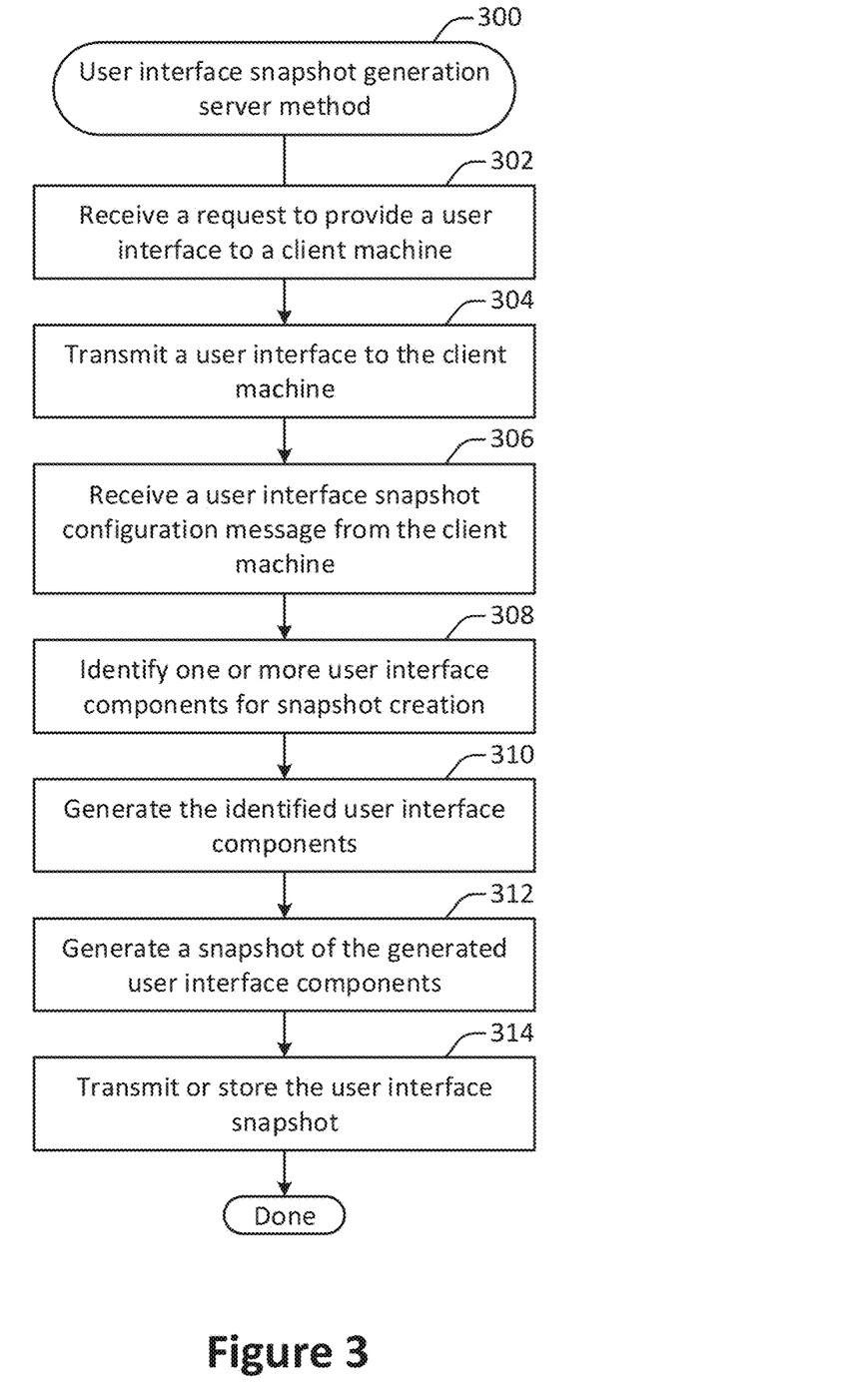
FIG. 3 illustrates an example of a server-side method for user interface snapshot generation, performed in accordance with one or more embodiments.

FIG. 3 illustrates an example of a server-side method 300 for user interface snapshot generation, performed in accordance with one or more embodiments. The method 300 may be performed at a server system. For example, the method 300 may be performed at one or more of the systems and devices shown in FIG. 4, FIG. 5, and FIG. 6. The method 300 may be performed in conjunction with one or more other methods described herein, such as the method 200 shown in FIG. 2 and/or the method 300 shown in FIG. 3.

A request to provide a user interface to a client machine is received at 302. According to various embodiments, the request may be received as part of the interaction of a user with data associated with an on-demand computing services environment. For instance, a user may access services via an on-demand computing services environment. Examples of such services may include a customer relations management system, a sales management system, a service management system, a customer marketing system, and/or other such information systems.

In some implementations, the request may be received as part of the interaction of a user with data stored in a remote database system. For instance, the remote database system may store information associated with a user's professional activities. The remote database system may store information such as user accounts, marketing operations, sales information, service information, and/or any other suitable data.

A user interface is transmitted to the client machine at 304. In some implementations, the user interface may be transmitted to a web browser at the client machine via the internet. Alternatively, or additionally, the user interface may be transmitted to the client machine via a different mechanism, such as a native application installed on the client machine and capable of receiving information via the internet.

A user interface snapshot configuration message is received from the client machine at 206. According to various embodiments, the user interface snapshot configuration message may be generated as described with respect to the method 300 shown in FIG. 2.

The identified user interface components are generated at 310. In some implementations, generating the identified user interface components may involve any of a variety of operations included in the original transmission of the user interface to the client machine at the operation 304. Such operations may include, but are not limited to: retrieving information from a database, dynamically creating a user interface based on user interface configuration information, and including the retrieved information in the generated user interface.

In some embodiments, generating the identified user interface components may involve one or more operations not performed when the user interface was originally transmitted to the client machine at 304. For example, the components identified at 308 may be generated, while other components not identified at 308 need not necessarily be generated. As another example, the components identified at 308 may be rendered in a web browser interface at the server after they are generated. The web browser interface need not be presented on a display screen, but rather may be generated virtually.

In some embodiments, generating the identified user interface components may involve applying one or more configuration parameters, which may cause one or more user interface components to be presented in a fashion different than that initially displayed in the user interface on the display screen at the client device. For example, a set of user interface components originally presented in a line may be repositioned in a grid. As another example, a color scheme alteration may be applied to one or more user interface components. As yet another example, one or more portions of a user interface component may be resized. For instance, text that appears readable when presented in an original user interface may appear too small when presented in a snapshot at its original size. In such a situation, the text may be resized when generating the screenshot.

In particular embodiments, a server-side application tool may be used to generate a view of a user interface for the purpose of constructing a snapshot. For instance, a headless browser may be used. Examples of headless browsers include, but are not limited to: Firefox, Chrome, Phantom JS, HTMLUnit, TrifleJS, Splash, and SimpleBrowser. The headless browser may render the identified user interface components at the server and then store the rendered user interface components as a snapshot image.

A snapshot of the generated user interface components is generated at 312. In some implementations, generating the snapshot may involve creating an image that combines the user interface components generated at 310. The snapshot may be generated in accordance with one or more configuration parameters. For example, user interface components may be presented in a grid more suitable for presentation in a snapshot. As another example, the snapshot may be created at a designated resolution suitable for storage and/or transmission to a snapshot recipient.

In some embodiments, generating the snapshot may involve generating a live view of the selected webpage components. For instance, user interface components may be generated in an isolated manner, independent of the webpage in which they were presented. Such components may then be sent to another individual or may be stored in such a way that they may be independently presented by the server as user interfaces to the recipients of the snapshot.

The user interface snapshot is transmitted or stored at 314. According to various embodiments, the user interface snapshot may be transmitted to one or more recipients. The user interface snapshot may be transmitted via any suitable message transmission medium. Such mediums may include, but are not limited to: a social networking messaging platform such as Salesforce Chatter, a messaging services such as short message service (SMS), WhatsApp, or Microsoft Skype, or email.

In particular embodiments, the snapshot or a thumbnail of the snapshot may be transmitted to the client machine. In this way, a user may receive verification that a snapshot was generated, and if desired may generate an additional snapshot.

In some implementations, the user interface snapshot may be stored in a database system. Alternately, or additionally, the user interface snapshot may be stored as a file in any network-accessible storage system.

Figure 4:
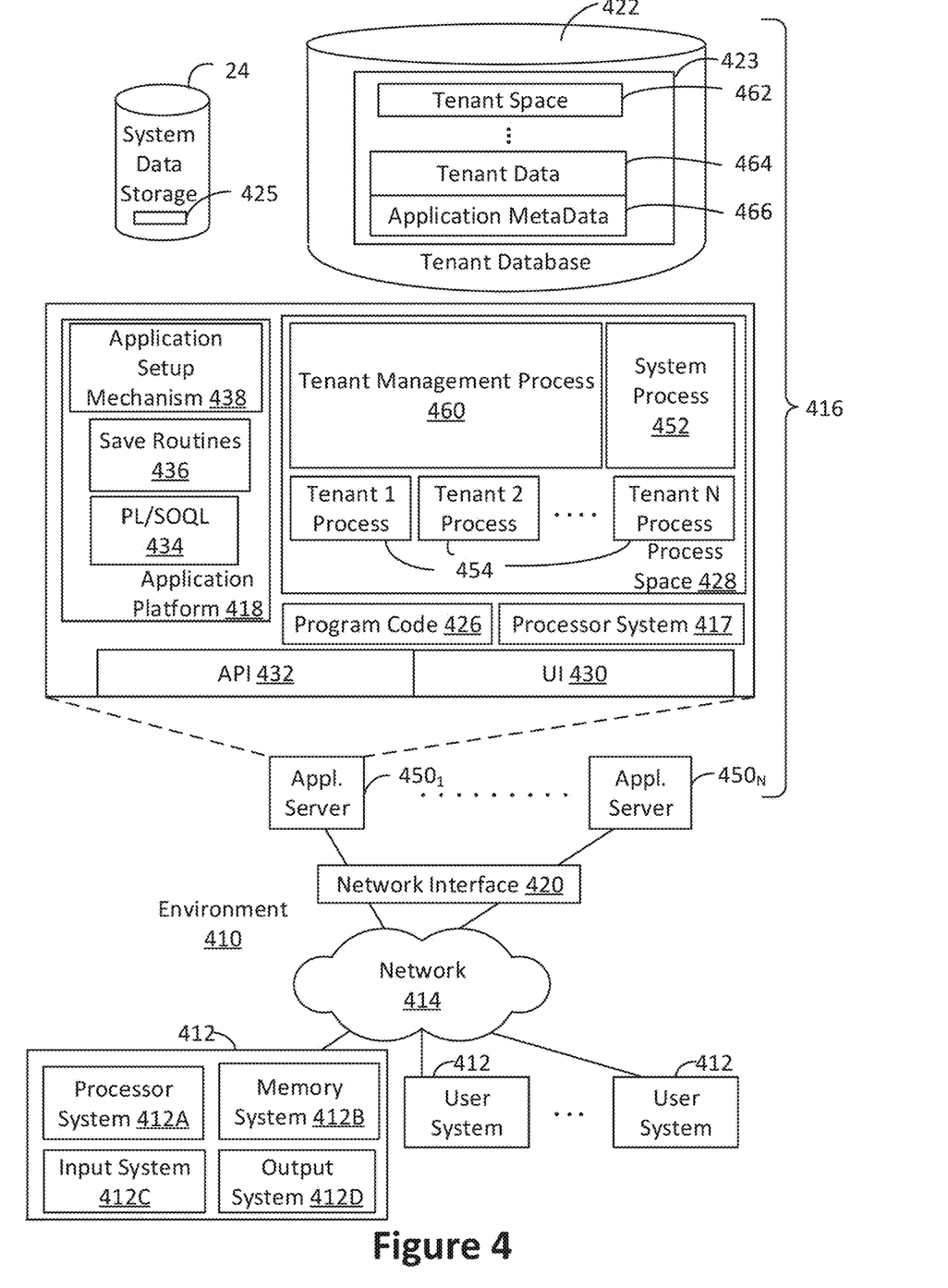
FIG. 4 shows a block diagram of an example of an environment ?10 that includes an on-demand database service configured in accordance with some implementations.

FIG. 4 shows a block diagram of an example of an environment 410 that includes an on-demand database service configured in accordance with some implementations. Environment 410 may include user systems 412, network 414, database system 416, processor system 417, application platform 418, network interface 420, tenant data storage 422, tenant data 423, system data storage 424, system data 425, program code 426, process space 428, User Interface (UI) 430, Application Program Interface (API) 432, PL/SOQL 434, save routines 436, application setup mechanism 438, application servers 450-1 through 450-N, system process space 452, tenant process spaces 454, tenant management process space 460, tenant storage space 462, user storage 464, and application metadata 466. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 416, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 416. Such applications may be developed by the database service provider or by users or third-party application developers accessing the service. Application platform 418 includes an application setup mechanism 438 that supports application developers' creation and management of applications, which may be saved as metadata into tenant data storage 422 by save routines 436 for execution by subscribers as one or more tenant process spaces 454 managed by tenant management process 460 for example. Invocations to such applications may be coded using PL/SOQL 434 that provides a programming language style interface extension to API 432. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 466 for a subscriber making such an invocation. Such system processes may also manage execution of application metadata 466 as an application in a virtual machine.

In some implementations, each application server 450 may handle requests for any user associated with any organization. A load balancing function (e.g., an F5 Big-IP load balancer) may distribute requests to the application servers 450 based on an algorithm such as least-connections, round robin, observed response time, etc. Each application server 450 may be configured to communicate with tenant data storage 422 and the tenant data 423 therein, and system data storage 424 and the system data 425 therein to serve requests of user systems 412. The tenant data 423 may be divided into individual tenant storage spaces 462, which can be either a physical arrangement and/or a logical arrangement of data. Within each tenant storage space 462, user storage 464 and application metadata 466 may be similarly allocated for each user. For example, a copy of a user's most recently used (MRU) items might be stored to user storage 464. Similarly, a copy of MRU items for an entire tenant organization may be stored to tenant storage space 462. A UI 430 provides a user interface and an API 432 provides an application programming interface to system 416 resident processes to users and/or developers at user systems 412.

System 416 may implement a web-based message transmission and configuration system. For example, in some implementations, system 416 may include application servers configured to implement and execute interspersed message batching software applications. The application servers may be configured to provide related data, code, forms, web pages and other information to and from user systems 412. Additionally, the application servers may be configured to store information to, and retrieve information from a database system. Such information may include related data, objects, and/or Webpage content. With a multi-tenant system, data for multiple tenants may be stored in the same physical database object in tenant data storage 422, however, tenant data may be arranged in the storage medium(s) of tenant data storage 422 so that data of one tenant is kept logically separate from that of other tenants. In such a scheme, one tenant may not access another tenant's data, unless such data is expressly shared.

Several elements in the system shown in FIG. 4 include conventional, well-known elements that are explained only briefly here. For example, user system 412 may include processor system 412A, memory system 412B, input system 412C, and output system 412D. A user system 412 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 412 to access, process and view information, pages and applications available from system 416 over network 414. Network 414 may be any network or combination of networks of devices that communicate with one another, such as any one or any combination of a LAN (local area network), WAN (wide area network), wireless network, or other appropriate configuration.

The users of user systems 412 may differ in their respective capacities, and the capacity of a particular user system 412 to access information may be determined at least in part by "permissions" of the particular user system 412. As discussed herein, permissions generally govern access to computing resources such as data objects, components, and other entities of a computing system, such as an interspersed message batching system, a social networking system, and/or a CRM database system. "Permission sets" generally refer to groups of permissions that may be assigned to users of such a computing environment. For instance, the assignments of users and permission sets may be stored in one or more databases of System 416. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 416 may provide on-demand database service to user systems 412 using an MTS arrangement. By way of example, one tenant organization may be a company that employs a sales force where each salesperson uses system 416 to manage their sales process. Thus, a user in such an organization may maintain contact data, leads data, customer follow-up data, performance data, goals and progress data, etc., all applicable to that user's personal sales process (e.g., in tenant data storage 422). In this arrangement, a user may manage his or her sales efforts and cycles from a variety of devices, since relevant data and applications to interact with (e.g., access, view, modify, report, transmit, calculate, etc.) such data may be maintained and accessed by any user system 412 having network access.

When implemented in an MTS arrangement, system 416 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 416 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 416 may also maintain system-level data usable by multiple tenants or other data. Such system-level data may include industry reports, news, postings, and the like that are sharable between tenant organizations.

In some implementations, user systems 412 may be client systems communicating with application servers 450 to request and update system-level and tenant-level data from system 416. By way of example, user systems 412 may send one or more queries requesting data of a database maintained in tenant data storage 422 and/or system data storage 424. An application server 450 of system 416 may automatically generate one or more SQL statements (e.g., one or more SQL queries) that are designed to access the requested data. System data storage 424 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 5A:
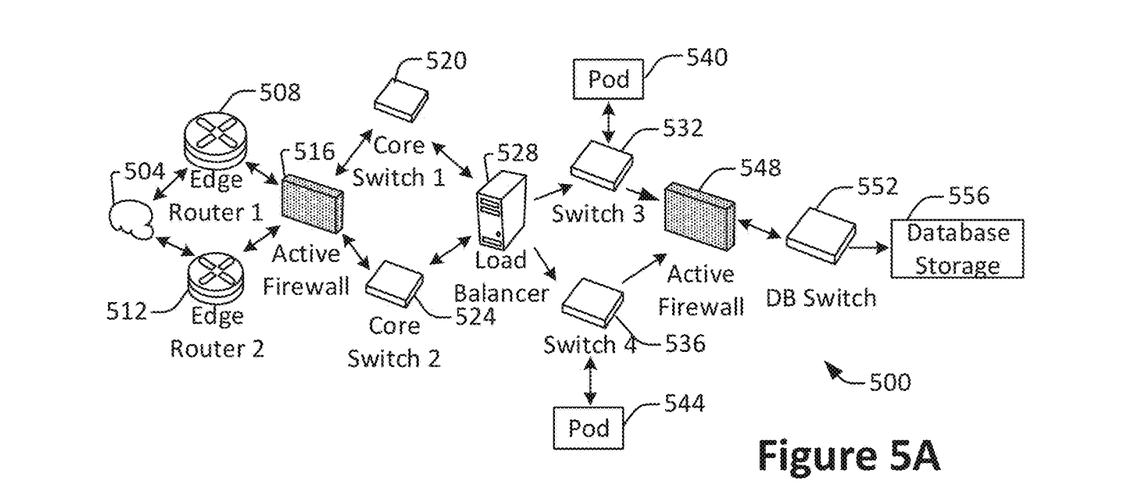
FIG. 5A shows a system diagram of an example of architectural components of an on-demand database service environment *00, configured in accordance with some implementations.

FIG. 5A shows a system diagram of an example of architectural components of an on-demand database service environment 500, configured in accordance with some implementations. A client machine located in the cloud 504 may communicate with the on-demand database service environment via one or more edge routers 508 and 512. A client machine may include any of the examples of user systems 412 described above. The edge routers 508 and 512 may communicate with one or more core switches 520 and 524 via firewall 516. The core switches may communicate with a load balancer 528, which may distribute server load over different pods, such as the pods 540 and 544 by communication via pod switches 532 and 536. The pods 540 and 544, which may each include one or more servers and/or other computing resources, may perform data processing and other operations used to provide on-demand services. Components of the environment may communicate with a database storage 556 via a database firewall 548 and a database switch 552.

Accessing an on-demand database service environment may involve communications transmitted among a variety of different components. The environment 500 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 5A and 5B.

The cloud 504 refers to any suitable data network or combination of data networks, which may include the Internet. Client machines located in the cloud 504 may communicate with the on-demand database service environment 500 to access services provided by the on-demand database service environment 500. By way of example, client machines may access the on-demand database service environment 500 to retrieve, store, edit, and/or process interspersed message batching information.

In some implementations, the edge routers 508 and 512 route packets between the cloud 504 and other components of the on-demand database service environment 500. The edge routers 508 and 512 may employ the Border Gateway Protocol (BGP). The edge routers 508 and 512 may maintain a table of IP networks or 'prefixes', which designate network reachability among autonomous systems on the internet.

In one or more implementations, the firewall 516 may protect the inner components of the environment 500 from internet traffic. The firewall 516 may block, permit, or deny access to the inner components of the on-demand database service environment 500 based upon a set of rules and/or other criteria. The firewall 516 may act as one or more of a packet filter, an application gateway, a stateful filter, a proxy server, or any other type of firewall.

In some implementations, the core switches 520 and 524 may be high-capacity switches that transfer packets within the environment 500. The core switches 520 and 524 may be configured as network bridges that quickly route data between different components within the on-demand database service environment. The use of two or more core switches 520 and 524 may provide redundancy and/or reduced latency.

In some implementations, communication between the pods 540 and 544 may be conducted via the pod switches 532 and 536. The pod switches 532 and 536 may facilitate communication between the pods 540 and 544 and client machines, for example via core switches 520 and 524. Also or alternatively, the pod switches 532 and 536 may facilitate communication between the pods 540 and 544 and the database storage 556. The load balancer 528 may distribute workload between the pods, which may assist in improving the use of resources, increasing throughput, reducing response times, and/or reducing overhead. The load balancer 528 may include multilayer switches to analyze and forward traffic.

In some implementations, access to the database storage 556 may be guarded by a database firewall 548, which may act as a computer application firewall operating at the database application layer of a protocol stack. The database firewall 548 may protect the database storage 556 from application attacks such as structure query language (SQL) injection, database rootkits, and unauthorized information disclosure. The database firewall 548 may include a host using one or more forms of reverse proxy services to proxy traffic before passing it to a gateway router and/or may inspect the contents of database traffic and block certain content or database requests. The database firewall 548 may work on the SQL application level atop the TCP/IP stack, managing applications' connection to the database or SQL management interfaces as well as intercepting and enforcing packets traveling to or from a database network or application interface.

In some implementations, the database storage 556 may be an on-demand database system shared by many different organizations. The on-demand database service may employ a single-tenant approach, a multi-tenant approach, a virtualized approach, or any other type of database approach. Communication with the database storage 556 may be conducted via the database switch 552. The database storage 556 may include various software components for handling database queries. Accordingly, the database switch 552 may direct database queries transmitted by other components of the environment (e.g., the pods 540 and 544) to the correct components within the database storage 556.

Figure 5B:
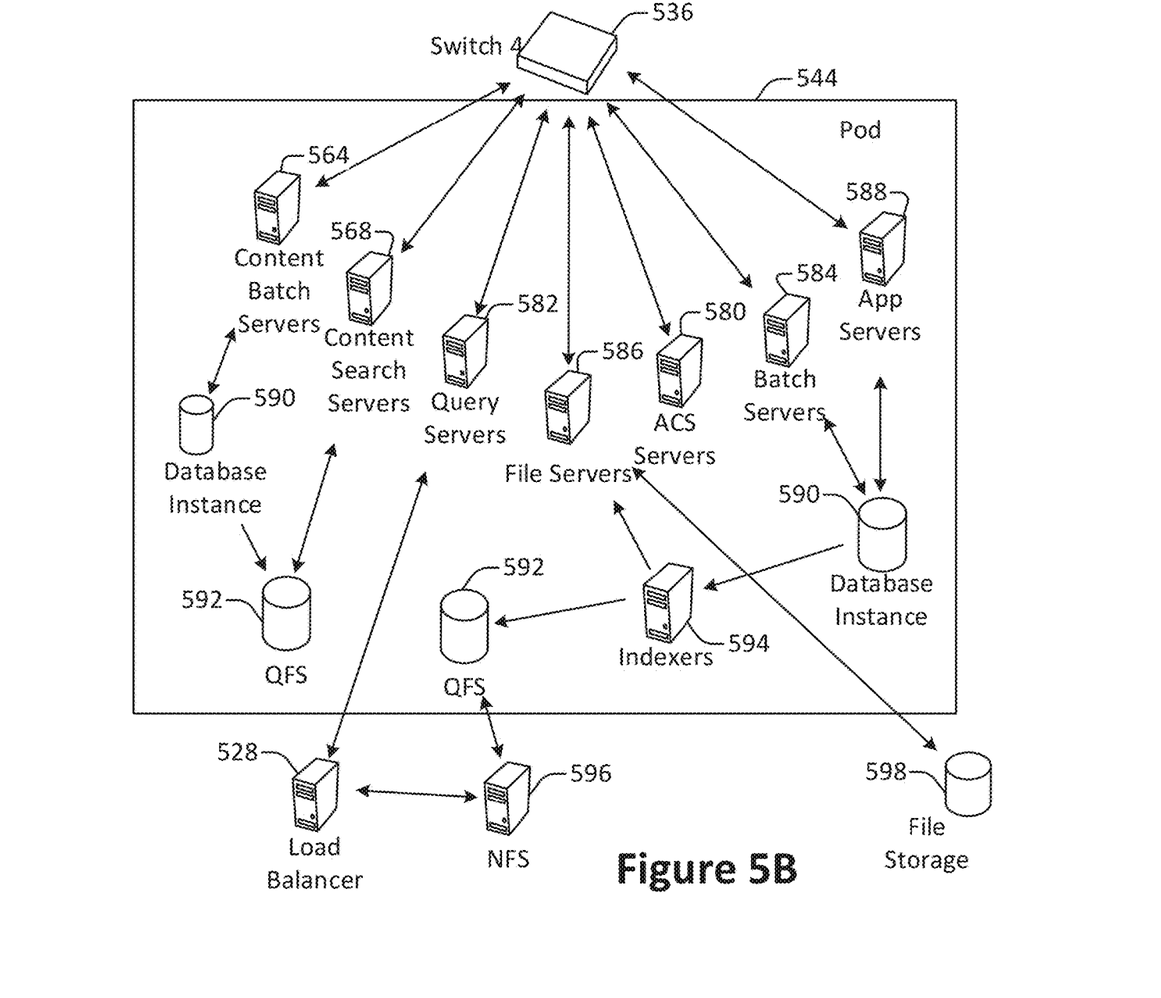
FIG. 5B shows a system diagram further illustrating an example of architectural components of an on-demand database service environment, in accordance with some implementations.

FIG. 5B shows a system diagram further illustrating an example of architectural components of an on-demand database service environment, in accordance with some implementations. The pod 544 may be used to render services to user(s) of the on-demand database service environment 500. The pod 544 may include one or more content batch servers 564, content search servers 568, query servers 582, file servers 586, access control system (ACS) servers 580, batch servers 584, and app servers 588. Also, the pod 544 may include database instances 590, quick file systems (QFS) 592, and indexers 594. Some or all communication between the servers in the pod 544 may be transmitted via the switch 536.

In some implementations, the app servers 588 may include a framework dedicated to the execution of procedures (e.g., programs, routines, scripts) for supporting the construction of applications provided by the on-demand database service environment 500 via the pod 544. One or more instances of the app server 588 may be configured to execute all or a portion of the operations of the services described herein.

In some implementations, as discussed above, the pod 544 may include one or more database instances 590. A database instance 590 may be configured as an MTS in which different organizations share access to the same database, using the techniques described above. Database information may be transmitted to the indexer 594, which may provide an index of information available in the database 590 to file servers 586. The QFS 592 or other suitable filesystem may serve as a rapid-access file system for storing and accessing information available within the pod 544. The QFS 592 may support volume management capabilities, allowing many disks to be grouped together into a file system. The QFS 592 may communicate with the database instances 590, content search servers 568 and/or indexers 594 to identify, retrieve, move, and/or update data stored in the network file systems (NFS) 596 and/or other storage systems.

In some implementations, one or more query servers 582 may communicate with the NFS 596 to retrieve and/or update information stored outside of the pod 544. The NFS 596 may allow servers located in the pod 544 to access information over a network in a manner similar to how local storage is accessed. Queries from the query servers 522 may be transmitted to the NFS 596 via the load balancer 528, which may distribute resource requests over various resources available in the on-demand database service environment 500. The NFS 596 may also communicate with the QFS 592 to update the information stored on the NFS 596 and/or to provide information to the QFS 592 for use by servers located within the pod 544.

In some implementations, the content batch servers 564 may handle requests internal to the pod 544. These requests may be long-running and/or not tied to a particular customer, such as requests related to log mining, cleanup work, and maintenance tasks. The content search servers 568 may provide query and indexer functions such as functions allowing users to search through content stored in the on-demand database service environment 500. The file servers 586 may manage requests for information stored in the file storage 598, which may store information such as documents, images, basic large objects (BLOBs), etc. The query servers 582 may be used to retrieve information from one or more file systems. For example, the query system 582 may receive requests for information from the app servers 588 and then transmit information queries to the NFS 596 located outside the pod 544. The ACS servers 580 may control access to data, hardware resources, or software resources called upon to render services provided by the pod 544. The batch servers 584 may process batch jobs, which are used to run tasks at specified times. Thus, the batch servers 584 may transmit instructions to other servers, such as the app servers 588, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 6:
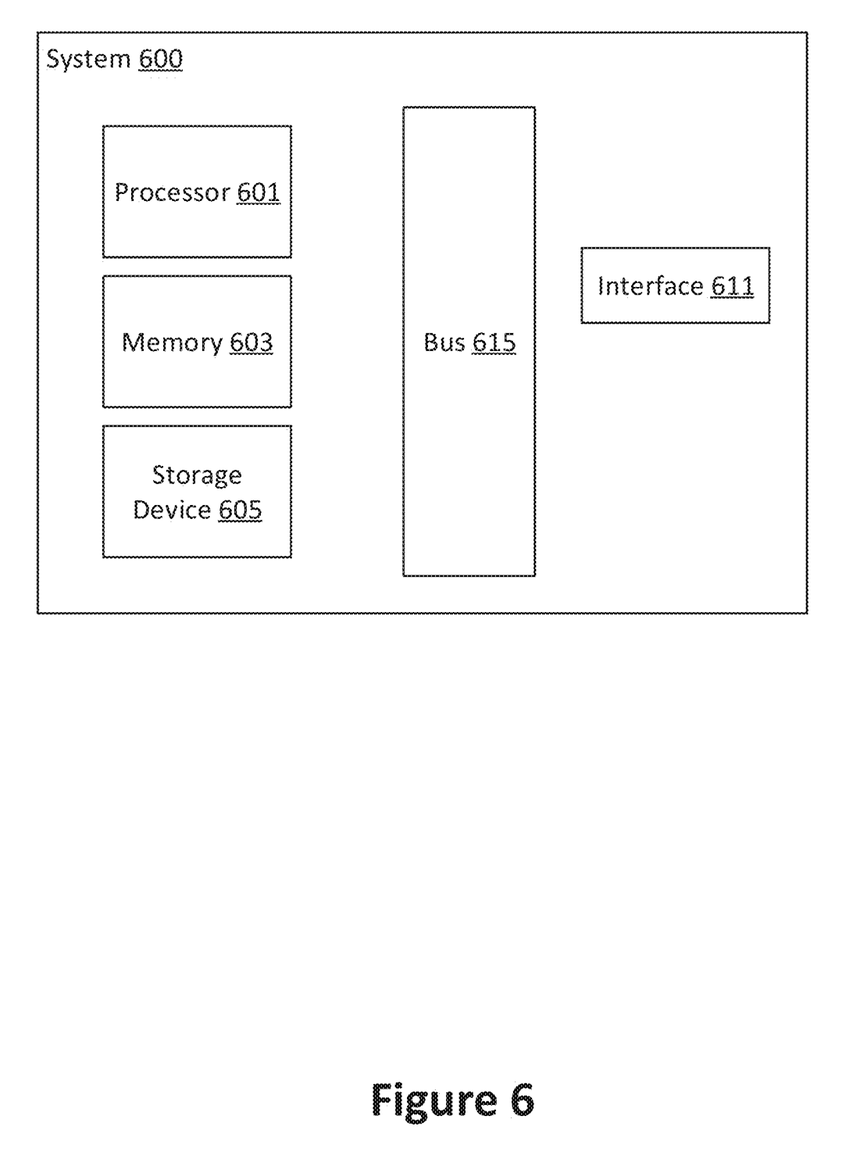
FIG. 6 illustrates one example of a computing device.

FIG. 6 illustrates one example of a computing device. According to various embodiments, a system 600 suitable for implementing embodiments described herein includes a processor 601, a memory module 603, a storage device 605, an interface 611, and a bus 615 (e.g., a PCI bus or other interconnection fabric.) System 600 may operate as variety of devices such as an application server, a database server, or any other device or service described herein. Although a particular configuration is described, a variety of alternative configurations are possible. The processor 601 may perform operations such as those described herein. Instructions for performing such operations may be embodied in the memory 603, on one or more non-transitory computer readable media, or on some other storage device. Various specially configured devices can also be used in place of or in addition to the processor 601. The interface 611 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computer-implemented method comprising:
    transmitting a user interface generation message from an on-demand computing services environment to a client machine via a network, the user interface generation message including instructions for presenting a database dashboard on a display screen at the client machine, the database dashboard including a plurality of user interface components, each user interface component presenting a respective view of information stored in a database system accessible via the on-demand computing services environment;
    receiving from the client machine one or more messages identifying two or more of the user interface components, an arrangement of the identified user interface components, and a user account within the on-demand computing services environment;
    creating a visual snapshot of the identified user interface components by rendering the identified user interface components in a headless browser at the database system, the identified user interface components including a designated user interface component that is not displayed on the display screen; and
    transmitting the visual snapshot to the user account.

2. The computer-implemented method recited in claim 1, wherein the visual snapshot is a live view of the identified user interface components.

3. The computer-implemented method recited in claim 1, wherein the visual snapshot is a static image of the identified user interface components.

4. The computer-implemented method recited in claim 1, wherein creating the visual snapshot comprises applying one or more snapshot configuration parameters, the snapshot configuration parameters specifying one or more characteristics associated the visual snapshot.

5. The computer-implemented method recited in claim 4, wherein a designated one of the snapshot configuration parameters is included in the user interface component selection message.

6. The computer-implemented method recited in claim 4, wherein the identified user interface components include a plurality of user interface components, and wherein a designated one of the snapshot configuration parameters identifies an arrangement of the plurality of user interface components.

7. The computer-implemented method recited in claim 4, wherein a designated one of the snapshot configuration parameters indicates a visual alteration to one or more of the identified user interface components.

8. The computer-implemented method recited in claim 1, wherein the database system is a multitenant database system within the on-demand computing services environment configured to provide computing services to a plurality of organizations via the internet.

9. A database system including a processor configured to perform a method, the method comprising:
    transmitting a user interface generation message from an on-demand computing services environment to a client machine via a network, the user interface generation message including instructions for presenting a database dashboard on a display screen at the client machine, the database dashboard including a plurality of user interface components, each user interface component presenting a respective view of information stored in the database system accessible via the on-demand computing services environment;
    receiving from the client machine one or more messages identifying two or more of the user interface components, an arrangement of the identified user interface components, and a user account within the on-demand computing services environment;
    creating a visual snapshot of the identified user interface components by rendering the identified user interface components in a headless browser at the database system, the identified user interface components including a designated user interface component that is not displayed on the display screen; and
    transmitting the visual snapshot to the user account.

10. The database system recited in claim 9, wherein the visual snapshot is a live view of the identified user interface components.

11. The database system recited in claim 9, wherein the visual snapshot is a static image of the identified user interface components.

12. The database system recited in claim 9, wherein creating the visual snapshot comprises applying one or more snapshot configuration parameters, the snapshot configuration parameters specifying one or more characteristics associated the visual snapshot.

13. The database system recited in claim 12, wherein a designated one of the snapshot configuration parameters is included in the user interface component selection message.

14. The database system recited in claim 12, wherein the identified user interface components include a plurality of user interface components, and wherein a designated one of the snapshot configuration parameters identifies an arrangement of the plurality of user interface components.

15. The database system recited in claim 12, wherein a designated one of the snapshot configuration parameters indicates a visual alteration to one or more of the identified user interface components.

16. One or more non-transitory computer-readable media having instructions stored thereon for performing a method, the method comprising:
   transmitting a user interface generation message from an on-demand computing services environment to a client machine via a network, the user interface generation message including instructions for presenting a database dashboard on a display screen at the client machine, the database dashboard including a plurality of user interface components, each user interface component presenting a respective view of information stored in a database system accessible via the on-demand computing services environment;
   receiving from the client machine one or more messages identifying two or more of the user interface components, an arrangement of the identified user interface components, and a user account within the on-demand computing services environment;
   creating a visual snapshot of the identified user interface components by rendering the identified user interface components in a headless browser at the database system, the identified user interface components including a designated user interface component that is not displayed on the display screen; and
   transmitting the visual snapshot to the user account.

* * * * *